(12) United States Patent
Gupta et al.

(10) Patent No.: US 9,355,129 B2
(45) Date of Patent: May 31, 2016

(54) SCHEDULING QUERIES USING A STRETCH METRIC

(75) Inventors: Chetan Kumar Gupta, Austin, TX (US); Song Wang, Austin, TX (US); Abhay Mehta, Austin, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 641 days.

(21) Appl. No.: 12/250,881

(22) Filed: Oct. 14, 2008

(65) Prior Publication Data

US 2010/0094852 A1 Apr. 15, 2010

(51) Int. Cl.
*G06F 17/30* (2006.01)

(52) U.S. Cl.
CPC .... *G06F 17/30306* (2013.01); *G06F 17/30442* (2013.01); *G06F 17/30448* (2013.01); *G06F 17/30522* (2013.01); *G06F 17/30536* (2013.01)

(58) Field of Classification Search
CPC .............. G06F 17/30306; G06F 17/30442; G06F 17/30457; G06F 17/3046; G06F 17/30516; G06F 17/30598; G06F 11/3409; G06F 11/3452; G06F 11/3476
USPC ........... 707/1, 2, 3, 4, 10, 705, 706, 713, 719, 707/781, 720, 721, 796
See application file for complete search history.

(56) References Cited

U.S. PATENT DOCUMENTS

| | | | |
|---|---|---|---|
| 6,026,391 A * | 2/2000 | Osborn et al. ......... | 707/999.002 |
| 7,356,524 B2 * | 4/2008 | Zurek et al. ................... | 707/720 |
| 7,383,253 B1 * | 6/2008 | Tsimelzon et al. ........... | 707/610 |
| 7,493,337 B2 * | 2/2009 | Chaudhuri et al. .... | 707/999.002 |
| 7,596,560 B2 * | 9/2009 | Rosengard ............. | 707/999.002 |
| 7,716,214 B2 * | 5/2010 | Li et al. ......................... | 707/719 |
| 7,849,113 B2 * | 12/2010 | Abraham et al. ............. | 707/830 |
| 2009/0024563 A1 * | 1/2009 | Sengar .............................. | 707/2 |
| 2009/0077013 A1 * | 3/2009 | Hu et al. ........................... | 707/2 |
| 2009/0112853 A1 * | 4/2009 | Nishizawa et al. ............... | 707/5 |
| 2009/0216718 A1 * | 8/2009 | Agrawal et al. ................... | 707/3 |
| 2009/0319474 A1 * | 12/2009 | Bestgen et al. .................... | 707/2 |
| 2010/0010965 A1 * | 1/2010 | Edlund et al. ..................... | 707/3 |

OTHER PUBLICATIONS

Becchetti, L. et al., "Scheduling to minimize average stretch without migration", ACM-SIAM symposium on Discrete Algorithms, Jan. 2000.
Becchetti, L. et al., "Semi-Clairvoyant Scheduling", Comput. Sci. Sep. 2004.
Becchetti, L. et al., "Online Weighted Flow Time and Deadline Scheduling", Aug. 2001.
Bedekar, A. et al., "Downlink Scheduling in CDMA Data Networks", 1999.
Bender, M. et al., "Flow and stretch metrics for scheduling continuous job streams", ACM-SIAM symposium on Discrete algorithms, Jan. 2002.

(Continued)

*Primary Examiner* — Dangelino Gortayo
(74) *Attorney, Agent, or Firm* — Mannava & Kang (57) ABSTRACT

A query scheduler orders queries in a queue. Each query is executed based on its position in the queue. When a new query is received, the new query is inserted in the queue. A position in the queue for inserting the new query is determined based on a stretch metric for each query in the queue.

19 Claims, 4 Drawing Sheets

(56) References Cited

OTHER PUBLICATIONS

Bender, M. et al., "Improved Algorithms for Stretch Scheduling", Proc. of 13th Annual ACM-SIAM symposium on Discrete algorithms, Jan. 1998.

Chekuri, C. et al., "Algorithms for minimizing weighted flow time", Proc. of the 33rd Annual ACM symposium on Theory of computing, Jul. 2001.

Crovella, M.E. et al., "Connection scheduling in web servers", USENIX Symposium on Internet Technologies and Systems, vol. 2, Oct. 1999.

Friedman, E. J. et al., "Fairness and efficiency in web server protocols", Proc. of the 2003 ACM SIGMETRICS, Jun. 2003, Abstract.

Kalyanasundaram, B. et al., "Scheduling Broadcasts in Wireless Networks", Proc. of the 8th Annual European Symposium on Algorithms, Sep. 2000.

Kellerer, H. et al., "Approximability and nonapproximability results for minimizing total flow time on a single machine", May 1996.

Legrand, A. et al., "Minimizing the stretch when scheduling flows of biological requests", Aug. 2006.

Leonardi, S. et al., "Approximating total flow time on parallel machines", May 1997.

Muthukrishnan, S. et al., "Online Scheduling to Minimize Average Stretch", Proc. of the 40th Annual Symposium on Foundations of Computer Science, Oct. 1999, Abstract.

Megow, N. et al., "Models and Algorithms for Stochastic Online Scheduling", Math. Oper., Aug. 2006.

Schroeder, B. et al., "How to Determine a Good Multi-Programming Level for External Scheduling", ICDE'06, 2006.

Sharaf, M. A. et al., "Efficient scheduling of heterogeneous continuous queries", Proc. of the 32nd international Conference on Very Large Data Bases, Sep. 2006.

* cited by examiner

SCHEDULING QUERIES USING A STRETCH METRIC

BACKGROUND

Many enterprises, such as companies, corporations, and organizations, are creating and deploying enterprise data warehouses(EDWs) to serve as their single source of corporate data for business intelligence. As referred herein, a data warehouse is a data storage or repository that includes one or more electrical or electronic data storage devices such as computers, servers, computer databases, and the like. Also, as referred herein and understood in the art, business intelligence (BI) includes applications and technologies that work together to collect, provide access to, and analyze data and information about operations of a business or a desired entity. Enterprise data warehouses are expected to both scale to enormous data volumes (hundreds of terabytes) and perform well under increasingly complex workloads, which typically include batch and incremental data loads, batch reports, and/or complex ad hoc queries. A key challenge is to manage each complex workload in order to meet stringent performance objectives. For example, batch load tasks may be required to finish within a specified time window before reports or queries can be serviced, batch reports may issue thousands of "roll-up" (aggregation) queries that are required to complete within a specified time window, and ad hoc queries may have user-specified deadlines and priorities. Thus, workload management includes admitting, scheduling and executing queries and allocating resources so as to meet these performance objectives.

Enterprise data warehouses are expected or desired to execute a continuous stream of queries. This is also often understood as running the queries in an interactive mode. Unlike online transaction processing (OLTP) workloads, the queries in a BI workload may vary several orders of magnitudes in execution time. This makes the scheduling of queries for workload management much more important in this context.

Accordingly, there is a desire to have effective scheduling of data warehouse or database queries so as to provide effective workload management of an enterprise data warehouse in order to meet the ever increasing demand of enterprises for efficient data storage and retrieval.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

The challenge of query scheduling for workload management is to schedule queries in a "good" and a "fair" manner. However, the understanding of "good" and "fair" may lead to several different metrics, such as average flow time, total weighted flow time, makespan, etc. Flow time is the difference between the end time and the arrival time of a query.

Conventional query scheduling focuses on minimizing some metric as a measure of Quality Of Service (QoS) or goodness. This QoS measure is to combine the QoS measure of individual queries in some way. Additionally for the same metric, one may either look at the average or the maximum of that metric. These may be understood in terms of $I_p$ norms for some $1 \leq p \leq \infty$ (The $I_p$ norm of a quantity $q_i$ is $(\Sigma^n_{i=1} q_i^p)^{1/p}$). The average is the $I_1$ norm and the maximum is the $I_\infty$ norm. Schedules with good average QoS may actually provide bad QoS to smaller number of scheduling jobs. For example, such schedules may induce starvation. Starvation is when a query does not get executed, for example, due to the scheduling function. To measure how well a schedule avoids starvation, one may use the $I_\infty$ norm. However, an optimal schedule under the $I_\infty$ norm may provide bad service to a majority of scheduling jobs. Thus, in these settings, it is better to look at $I_2$ or $I_3$ norms. The $I_p$, $1 < p < \infty$ objective function still considers the average case in the sense that it takes into account all values, but because $q^p$ is a strictly convex function of q, the $I_p$ norm more severely penalizes the outliers. This is further discussed below.

Scheduling schemes may be designed for a system with one or more processors, and they may operate offline or online. In the online model the scheme does not know all the instances ahead of time. Another restriction with online schemes is that their complexity should be sub-linear, otherwise the scheme could be too expensive to use in a real life scenario. Another important classification of scheduling schemes is preemptive or non-preemptive. In a preemptive setting an currently running job may be preempted by a new job. The preempted job then waits again for its turn at execution.

According to one or more embodiments described herein, there is described an external scheduling scheme, hereinafter also referred to as an external scheduler, for database queries. The advantage of an external approach is that it is portable, easy to implement, and does not require complex changes to the internals of a database management system (DBMS). Unlike the internal approach which directly schedules the resources inside the backend DBMS, an external scheduling approach is applicable across different classes of workloads because external scheduling works independently of a system's bottleneck resources. In one embodiment, the external scheduler operates online because in a DBMS, queries arrive in a continuous stream.

Also according to one or more embodiments described herein, the external scheduler operates in a non-preemptive setting. This is because for an external scheduler, the only way to force preemption is to change priorities, that is, to decrease the priority of the currently running query and insert the new query for execution at a higher priority. In terms of scheduling, this is not a clean approach because the lower priority query is still active and claims resources. Additionally, this requires the operating system (OS) to have a preemptive priority scheduler. Preempting frequently may also prove to be an expensive operation for an EDW where the arrival rate of queries is very large and a lot of queries are very small, whose preemption adds an unnecessary overhead. Furthermore, the external scheduler may be designed for one processor and leaves it to the DBMS's internal scheduler to decide on the parallelization of the query plan.

Accordingly, in at least one embodiment, there is provided an external scheduler for scheduling queries in an online, non-preemptive setting. The complexity of such a scheduler is O(log n) at time of insertion of a query into the processing queue and O(1) at the time of selection of query, where n is the number of queries in the queue. It tries to minimize the $I_2$ or $I_3$ norms as further described below in light of the following references.

Figure 1:
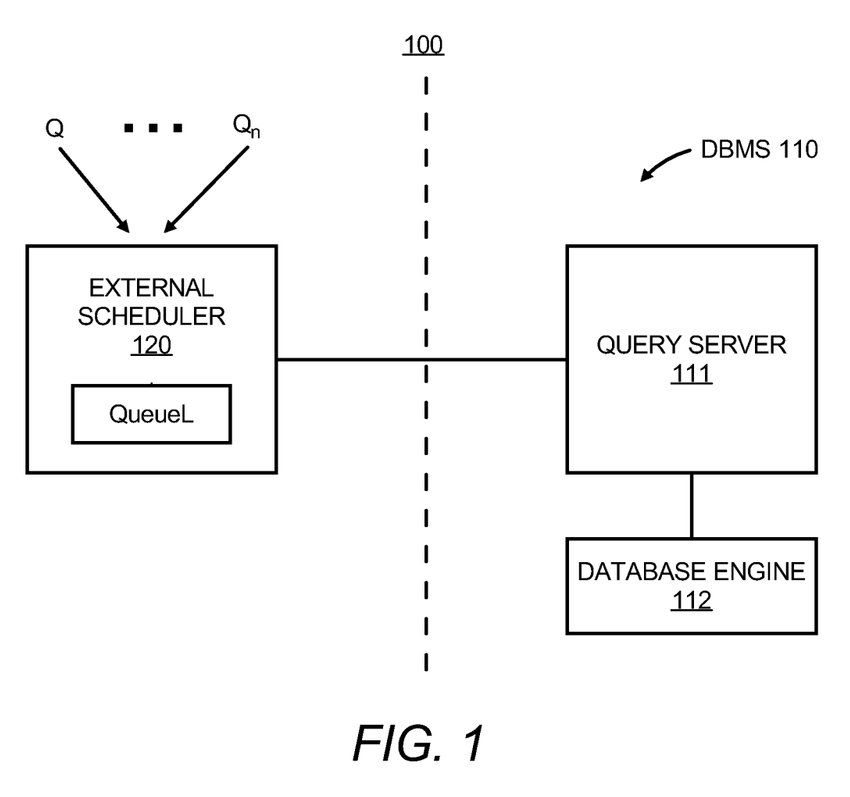
FIG. 1 illustrates a system, according to an embodiment.

FIG. 1 illustrates a system 100 including a DBMS 110 and an external scheduler 120 according to an embodiment. The DBMS 110 includes a query server 111 and a database engine 112 configured to receive and execute queries and return query results.

The external scheduler 120 schedules queries to be executed by the DBMS 110. For example, the external scheduler 120 receives queries Q1-Qn and maintains a queue L identifying an order for the database engine 112 to execute the queries Q1-Qn. The queries Q1-Qn may represent a continuous stream of queries received for execution from one or more computer systems. The external scheduler 120 runs an opportunistic query scheduling scheme to determine the order of the queries Q1-Qn in the queue L. When a new query arrives, the external scheduler 120 determines the position in the queue L to insert the query. The external scheduler 120 uses the opportunistic query scheduling scheme to determine the order of the queries in the queue and to determine a position of a new query in the queue. The opportunistic query scheduling scheme is described in detail below that considers a stretch metric when scheduling.

First, as referred herein, the stretch of a query at time t is characterized as:

$$S_j = (t - a_j)/p_j$$

And when $t = C_j$, the final stretch for a query is:

$$S_j = (C_j - a_j)/p_j = (w_j + p_j)/p_j$$

where t is the current time, $C_j$ is the end time of a query, $a_j$ is the arrival time, $p_j$ is the execution time (also referred to herein as processing time) of a query, and $w_j$ is the wait time of the query. Wait time may vary from 0 (from the time the query is received) to the wait till the query is executed. Stretch captures the idea of fairness from a user's perspective. Also as referred herein, minimizing the stretch of a query means minimizing the final stretch. Thus, hereinafter for discussion purposes, stretch is to indicate final stretch unless the meaning is not clear from the context.

Second, as referred herein, the $I_2$ and $I_3$ norms for a set of values $\{x_i : i = 1 \ldots n\}$ are, respectively:

$$I_2 \text{ norm} = (\Sigma(x_i)^2)^{1/2}, I_3 \text{ norm} = (\Sigma(x_i)^3)^{1/3}$$

Figure 2:
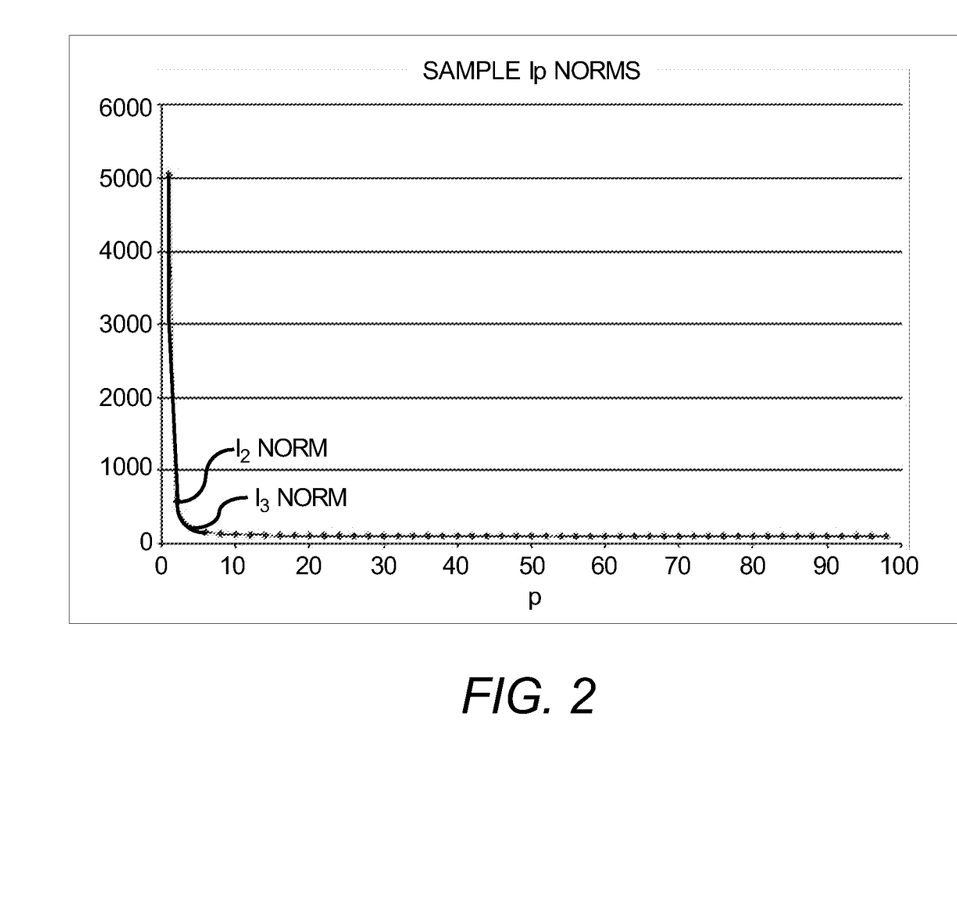
FIG. 2 illustrates plots for $I_p$ norms for the series 1, 2, ..., 100, according to an embodiment.

FIG. 2 illustrates plots for the $I_p$ norms for the series p=1, 2, ..., 100 and a set of execution times. As illustrated in FIG. 2, as p≥4, all $I_p$ norms are very similar to $I_{100}$ norm and $I_2$ and $I_3$ norms appear to capture both $I_1$ and $I_\infty$ norms. Further, in one embodiment, assuming that there are two sets of stretches with the same mean but widely different maxima, the scheduling scheme is to pick the stretch with the lower minima, but the $I_1$ norm may not be able to differentiate between the two sets of stretches. Similarly, for two sets of stretches with the same maximum but different means, the scheduling scheme is to pick the set with the lower mean, but $I_\infty$ norm may not be able to tell the difference. In both of these cases, $I_2$ and $I_3$ norm are to make the right choice.

Third, as referred herein, the size of a query is equal to the processing time (i.e., the time it takes to run or execute the query to get results) of a query $p_q$ as if it were running by itself on an unloaded system.

Fourth, as referred herein for purposes of query scheduling, a weight function, $W_q$, for a query q is introduced as:

$$W_q = 1/p_q + C(t - a_q)$$

Where $p_q$ is the execution time for a query q, t is the current time and $a_q$ is the arrival time for a query q and C>0 is some constant. In one embodiment, the scheduling scheme is to execute the query with the highest weight first.

An effective query scheduler factors in both the processing time and wait time in a single scheduling scheme so that while the smaller queries are executed quickly, the larger queries do not have to wait infinitely to get executed. Note that, if C=0, then the scheduling scheme becomes Shortest Job First (SJF). Thus, having a non-zero C ensures that weights of the larger queries increase, and at some point their weight starts becoming greater than new smaller queries and there is no starvation. As referred herein, starvation occurs when a query never gets to execute.

For values of C greater than some constant, the scheduling scheme becomes First In First Out (FIFO). Computation for such a value of C is as follows. For a query that has already arrived, let the shortest possible waiting time be one and let the size of the largest query be ψ and that of the smallest be one. The scheduling scheme behaves as a FIFO scheme if the largest query with waiting time of 1 has a higher weight than a newly arrived smallest query. That is:

$$1/\psi + C > 1$$

$$\Rightarrow C > 1 - 1/\psi$$

Thus, for all values of C>1−1/ψ, the scheduling scheme is to behave as a FIFO queue. This linear equation has nice properties, in that it can be converted to a sub-linear scheme. The inventors have found that this property is desirable to making the scheduling scheme useful in a real world setting, as further discussed later along with the extension of the linear function to a family of functions. Note that the query scheduling scheme with the aforementioned characteristics may be implemented with O(log n) complexity at time of inserting the query into the execution queue and O(1) complexity at the time of selecting a query for execution. Here, n, is the number of queries in the queue.

The opportunistic query scheduling scheme used by external scheduler 120 may use a value of C where 0<C<=1−1/ψ so the queue L does not only behave as a FIFO queue or an SJF queue. The query scheduling scheme is an opportunistic scheme because while it is primarily a SJF scheme, it is operable to insert larger queries for execution at an opportune moment.

To enhance efficiency of the opportunistic query scheduling scheme, the queue of queries are not to be sorted to obtain the highest-weighted query every time a new query is to be executed. To avoid this frequent sorting, a queue L of queries to be executed is maintained in order of their weights. Every time a new query q comes in, it is inserted in the queue L in the order of its weight $W_q$. The inventors have found that because the scheduling scheme is linear, the queue L maintains that order.

To insert a new query q in order, its weight $W_q$ is first computed. For a new query, the waiting time (or arrival time) is zero, i.e., $t = a_q$. Then, $W_q = 1/p_q$. For existing queries, their weights may be computed as $1/p + C\Delta t$ where $\Delta t$ is their waiting time. Then, in the queue L of queries, the new query q is inserted between two queries a and b, such that $W_a \leq W_q \leq W_b$, i.e.:

$$1/p_a + C(t-a_a) \leq 1/p_q \leq 1/p_b + C(t-a_b)$$

Figure 3:
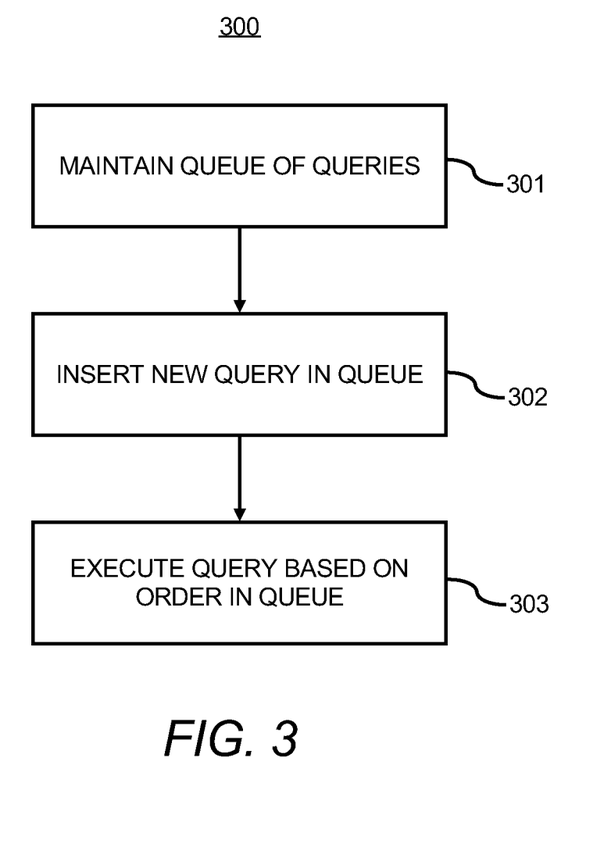
FIG. 3 illustrates a method for opportunistic query scheduling, according to an embodiment.

FIG. 3 illustrates a method 300 for implementing the aforementioned opportunistic query scheduling scheme that may be used by the external scheduler 120 shown in FIG. 1.

At 301, the queue L of queries are maintained such that their weights are in order $W_{q1} > W_{q2} > \ldots > W_{qn}$. This represents the order of execution for the queries in the queue L.

At 302, whenever a new query q comes in, it is inserted in the order. That is q is inserted such that $W_{q1} > \ldots > W_{qi} > W_q > W_{qj} > \ldots > W_{qn}$.

At 303, when a query finishes execution in the DBMS (such as an in an EDW), insert the first query in the order, $W_{q1}$, for execution, for example, by the database engine 112 in the DBMS 110 shown in FIG. 1.

Because a queue of queries are used here, it is useful to reference the concept of predecessor and successor of a query. That is, as referred herein, a query x is a successor of a query y if it exists behind y in the list L, such that $W_x < W_y$ and y is executed before x. Also as referred herein, a query x is a predecessor of a query y if it exists ahead off y in the list L, such that, $W_y < W_x$ and x is executed before y.

The aforementioned opportunistic query scheduling scheme properly operates to insert queries in the order based on their weight W. Once a query is inserted it maintains its relative order. So, one needs to worry about the position only at time of insertion. Hence, at time of execution there is no need to look among the queue of queries to find the query with the highest rank. The query at the head of the queue has the highest rank and this is the query that is executed. This is shown in an example below. It should be noted that uppercase W denotes the weight, and lowercase w denotes the waiting time as discussed earlier.

In one example, a query q is the first query in the queue L. That is, q has no predecessor in the queue L. Consequently, its weight, $W_q$, is the highest of all weights in the queue. To show this, the opposite is first assumed. That is, let there be a query r in the L such that $W_r > W_q$, such that:

$$1/p_q + C(t-a_q) < 1/p_r + C(t-a_r)$$

$$\Rightarrow 1/p_q + Cw_q < 1/p_r + Cw_r \quad \text{Eq. (A)}$$

Query r could have arrived either before or after query q. Each of these two cases is now considered. In case 1, where query r arrives before query q, that is, q arrives after r, then at some time $\Delta t$ after arrival of q: $w_r = w_q + \Delta t$.

From the above equation (A):

$$1/p_q + Cw_q < 1/p_r + Cw_r \quad \text{Eq. (B)}$$

$$\Rightarrow 1/p_q + Cw_q < 1/p_r + C(w_q + \Delta t)$$

$$\Rightarrow 1/p_q < 1/p_r + C\Delta t \quad \text{Eq. (C)}$$

Equation (C) indicates that because the weight of q is less than the weight of r at the time of insertion, q is to be a successor of r in the queue L when q is inserted. This means that r is to be a predecessor of q in the queue L, which is contrary to equation (A), and hence q could not have arrived before r.

In case 2, where the query q arrives before query r, that is, r arrives after q, then at some time $\Delta t$ after arrival of r $w_q = w_r + \Delta t$. From equation (B):

$$1/p_q + Cw_q < 1/p_r + Cw_r \quad \text{Eq. (B)}$$

$$\Rightarrow 1/p_q + C(w_r + \Delta t) < 1/p_r + Cw_r$$

$$\Rightarrow 1/p_q + C\Delta t < 1/p_r \quad \text{Eq. (D)}$$

Equation (D) indicates that because the weight of r is greater than the weight of q at the time of insertion, q is to be a successor of r in the queue L when r is inserted. Thus, r is to be a predecessor of q in the queue L, which is contrary to equation (A), and hence q could not have arrived before r. That is, at time of insertion, the query q is to be a predecessor of r in the queue L, and r is to be a successor q in the queue L. This is also contrary to equation (A), and hence r could not have arrived after q. Together, these two statements imply that there is no query r such that its weight is greater than the weight of the first query q in queue L.

The complexity of the opportunistic query scheduling scheme is now shown. That complexity is $O(\log n)$ for insertion and $O(1)$ for selection for execution. The queue L of queries is an ordered list. Insertion in an ordered list may be done in $O(\log n)$ using a binary search technique. Selection of a query for execution is $O(1)$ because the first element of list L is selected for submission to a database system, such as the DBMS 110, for execution.

In one embodiment, the value of C in weight W is a key to the success of the opportunistic query scheduling algorithm. As noted earlier, when C=0, the opportunistic query scheduling scheme becomes a SJF scheme, and when $C > 1 - 1/\psi$, the opportunistic query scheduling scheme becomes a FIFO scheme. A SJF scheme is considered optimal for minimizing the total weighted flow, which is equivalent to minimizing the $I_1$ norm. FIFO minimizes the max flow, which is equivalent to minimizing the $I_\infty$ norm. Thus, a C value between 0 and $1-1/\psi$ may help to minimize a p-norm such that $1 < p < \infty$. The closer the value of C is to zero, the more it is to favor minimizing lower p-norms like $I_2$ or $I_3$. As noted earlier, for the opportunistic query scheduling scheme, there is a desire to minimize the $I_2$ or $I_3$ norm of a related metric, namely, the stretch which is a special case of weighted flow. As also discussed earlier, the $I_2$ and $I_3$ objective functions are considered the average case in the sense that it takes into account all values, but because $x^p$ is a strictly convex function of x, the $I_p$ norm more severely penalizes the outliers than $I_1$ and does not suffer from the drawbacks of an $I_\infty$ norm because the maximum value is minimized at the expense of all other values. Thus, C may be computed as follows. In general for the highest weight first scheme, query a supersedes another query b if $W_a \geq W_b$. In an example where their weights are equal:

$$1/p_a + Cw_a = 1/p_b + Cw_b$$

$$\Rightarrow C(w_a - w_b) = 1/p_b - 1/p_a$$

$$\Rightarrow C = (1/p_a p_b)(p_b - p_a)/(w_b - w_a) \quad \text{Eq. (1)}$$

A scheduling model is to be designed such that the stretch of queries of various sizes is equal. This helps to make sure that if there is a goal to minimize the maximum stretch, such a minimization does not affect the individual stretches. Thus, in a sense, the $I_1$ norm is controlled. To do this, a stipulation is made that one query may supersede another only if their stretches are equal. Then:

$$S_a = S_b$$

$$\Rightarrow (w_a + p_a)/p_a = (w_b + p_b)/p_b$$

$$\Rightarrow w_a p_b = w_b p_a \quad \text{Eq. (2)}$$

Substitute equation (2) in equation (1):

$$C = 1/(w_a p_b) \quad \text{Eq. (3)}$$

Some bounds are provided on the maximum value of stretch a query faces so as to control the $I_\infty$ norm. To do this, a worst case scenario is used, wherein there are n queries in the system linearly decreasing in size. For ease of notation and without a loss of generality, the smallest query size is assumed a value of 1, and the largest is then $\psi$. The query sizes are then $\psi, \psi-1, \ldots, 1$. The worst case for largest stretch is when the queries are executed in order of their size, starting with $\psi$ and ending with 1. Then in that case the stretch for the small query is:

$$S_s = (w_s + p_s)/p_s$$

Where $p_s = 1$ and the waiting time $w_s$ will be equal to the execution times of all the queries larger than s. Hence:

$$w_s = \psi + \psi - 1 + \ldots + 2$$

Substituting:

$$S_s = (\psi + (\psi-1) + \ldots + 2 + 1)/1$$

$$\Rightarrow S_s = \psi(\psi-1)/2 \qquad \text{Eq. (4)}$$

Now that there is in place a bound on the worst case value for stretch, the conditions in equations (3) and (4) are combined together to enable control for both $I_1$ and $I_\infty$ norm together. In this sense, it enables a minimization of $I_2$ or $I_3$ norm. For example, for two queries representing the largest and smallest queries, there is a desire to put in the largest query first only if it does not cause the stretch of the smallest query to go beyond the aforementioned worst case. Thus, longest wait time for the largest query is:

$$S_l = S_s = \psi(\psi-1)/2$$

$$\Rightarrow (w_l + p_l)/p_l = \psi(\psi-1)/2$$

$$\Rightarrow (w_l + \psi)/\psi = \psi(\psi-1)/2$$

$$\Rightarrow w_l = \psi((\psi(\psi-1)/2)-1)) \qquad \text{Eq. (5)}$$

Implementing equation (5) in equation (2), and noting that $p_b = 1$, C is calculated as:

$$C = 1/(\psi(\psi(\psi-1)/2-1)))$$

For large values of $\psi$, C can be rewritten as:

$$C = 2/\psi^3$$

It may not always be possible to know the value of $\psi$ a-priori. However, the inventors have found that a good estimate also suffices. Otherwise, in an alternative embodiment, the opportunistic query scheduling scheme is executed or run as SJF for some duration until there is a reasonable idea about the value of $\psi$. If the value of $\psi$ changes during the execution, the queue L would have to be resorted.

A problem with scheduling algorithms may be starvation, that is, the query never gets to execute. A SJF scheme, which is known to be optimal for the non-preemptive case of average flow time, may suffer from this problem in an online scenario as some long running job might never get a turn to execute. However, the opportunistic query scheduling scheme in various embodiments as described herein does not lead to the starvation of any query as described in the next example.

In this example, a query q that has the lowest weight in the queue L. Also note that the weight of a newly arrived query is $1/p$, which is the largest for $p=1$, in which case the weight is 1. The longest a query has to wait before its weight becomes one is:

$$1/p + Cw = 1$$

$$\Rightarrow w = (1/C)(1-1/p)$$

The largest value for the above expression is $(1/C)(1-1/\psi)$, where $\psi$ is the size of the largest query. After waiting for this long a query q is to have higher weight than any incoming query. Hence, in the queue L no new query is added ahead of query q. Once all the existing queries ahead of q are executed, query q is to be executed too. Because every query gets a chance to execute, it is to be executed. Hence, the OQI scheduling scheme does not lead to starvation.

The choice of weight functions points to a family of functions which could be used for scheduling. A general member of the weight family may be written as:

$$f = C_1/p + C_2 w^k$$

where, $C_1, C_2 > 0$ and k are some constants, p is the processing time of the query and w is the wait time at time t for the query. Then, simply execute the query at time t that has the highest value for the function. A lot of existing scheduling functions may be derived from this. For instance, $C_2 = 0$ or $k = 0$, the opportunistic query scheduling schemes becomes a SJF scheme. A previous weight function was obtained with $k=1$ and $C_1 = 1$ and some $C_2$. For $C_1 = 0$ and $C_2$, $k > 0$, the opportunistic query scheduling scheme becomes a FIFO scheme. Another weight function that provides good results is with $C_1 = 1$ and $C_2 = 1$ and $k = 0.0003$.

Figure 4:
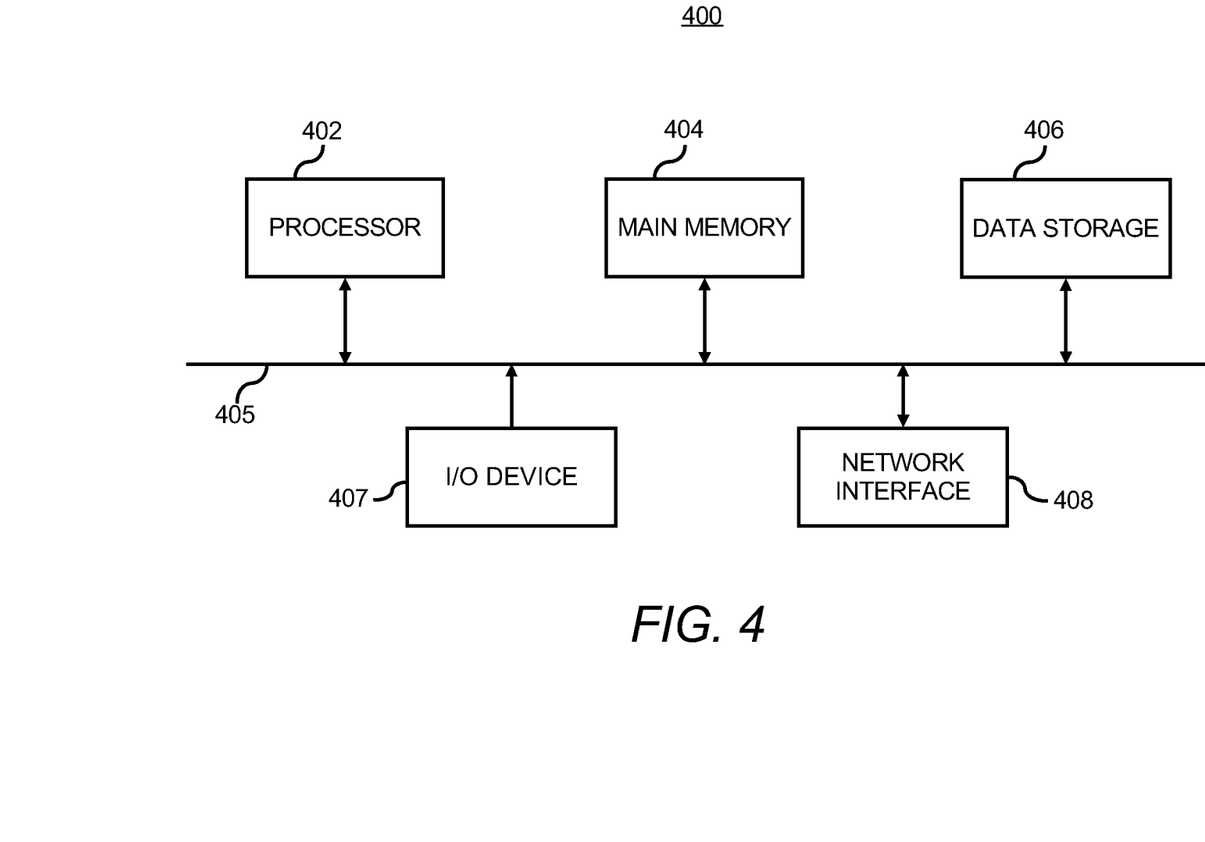
FIG. 4 illustrates a computer system, according to an embodiment.

FIG. 4 illustrates a block diagram of a computer system 400 operable to be used as a platform for implementing the opportunistic query scheduling system. The computer system 400 may be external to a database system, such as a DBMS or EDW, that is executed by one or more other computer systems.

Commands and data from the processor 402 are communicated over a communication bus 405. The computer system 400 also includes a main memory 404, such as a Random Access Memory (RAM), where software may be resident during runtime, and data storage 406. The data storage 406 includes, for example, a hard disk drive and/or a removable storage drive, representing a floppy diskette drive, a magnetic tape drive, a compact disk drive, etc., or a nonvolatile memory where a copy of the software may be stored. The data storage 406 may also include ROM (read only memory), EPROM (erasable, programmable ROM), EEPROM (electrically erasable, programmable ROM). In addition to software for routing and other steps described herein, routing tables, network metrics, and other data may be stored in the main memory 404 and/or the data storage 406. A user interfaces with the computer system 400 with one or more I/O devices 404, such as a keyboard, a mouse, a stylus, display, and the like. A network interface 408 is provided for communicating with other computer systems.

One or more of the steps of the methods described herein and other steps described herein may be implemented as software embedded on a computer readable medium, such as the memory 404 and/or data storage 406, and executed on the computer system 400, for example, by the processor 402. For example, they may exist as software program(s) comprised of program instructions in source code, object code, executable code or other formats for performing some of the steps. Any of the above may be embodied on a computer readable medium, which includes storage devices. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for scheduling queries, the method comprising:
   maintaining a queue of queries, the queue identifying an order for executing the queries;
   receiving a new query;
   determining, for the new query and for each of the queries in the queue, a stretch metric indicative of a Quality of Service (QoS) measure, wherein the stretch metric for each of the queries is based on an end time of the query, an arrival time of the query, and the processing time of the query;
   minimizing an $I_p$ norm of the stretch metric for at least some of the queries in the queue, wherein p is a finite, real number greater than 1;
   determining, by a processor, a weight for the new query and a weight for each of the queries in the queue, wherein the weight for a query is based on the stretch metric of the query, and wherein the weight of a largest query in the queue is determined to be a largest weight only if such determination does not cause the stretch metric of the smallest query in the queue to exceed a predetermined threshold wait time;
   determining, by the processor, a position in the queue to insert the new query by comparing the weight of the new query to the weights of the queries in the queue;
   inserting the new query in the determined position in the queue; and
   selecting a query from the queue to execute based on the order for executing the queries identified from the queue, wherein the query with the largest weight is executed first.

2. The method of claim 1, wherein the queries are inserted into the queue based on an order of their weights.

3. The method of claim 2, wherein the weights are ordered from highest to lowest in the queue and the new query is positioned in the queue between all weights greater than the new query's weight and all weights less than the new query's weight.

4. The method of claim 1, wherein a highest weight for any query in the queue is 1, where a query in the queue with a highest weight is executed first.

5. The method of claim 4, wherein a longest a query in the queue has to wait before its weight becomes 1 is:

$1/p+Cw=1$, where $w=(1/C)(1-1/p)$, and p is the processing time, C is a constant and w is the wait time.

6. The method of claim 1, wherein a weight function used to determine the weights of the queries is from a weight family characterized by:

$f=C_1/p+C_2 w^k$ where, $C_1$ and $C_2>0$, and k, $C_1$ and $C_2$ are constants, p is the processing time of the query, and w is the wait time.

7. The method of claim 6, further comprising:
   selecting values for $C_1$ and $C_2$ such that the queue represents more closely a shortest job first queue rather than a first-in-first-out queue, and such that starvation is avoided for queries having large execution times.

8. At least one non-transitory computer readable medium storing instructions that when executed by a computer system cause the computer system to:
   maintain a queue of queries, the queue identifying an order for executing the queries;
   receive a new query;
   determine, for the new query and for each of the queries in the queue, a stretch metric indicative of a Quality of Service (QoS) measure, wherein the stretch metric for each of the queries is based on an end time of the query, an arrival time of the query, and the processing time of the query;
   minimize an $I_p$ norm of the stretch metric for at least some of the queries in the queue, wherein p is a finite, real number greater than 1;
   determine a weight for the new query and a weight for each of the queries in the queue, wherein the weight for a query is based on the stretch metric of the query, and wherein the weight of a largest query in the queue is determined to be a largest weight only if such determination does not cause the stretch metric of the smallest query in the queue to exceed a predetermined threshold wait time;
   determine a position in the queue to insert the new query by comparing the weight of the new query to the weights of the queries in the queue;
   insert the new query in the determined position in the queue; and
   select a query from the queue to execute based on the order for executing the queries identified from the queue, wherein the query with the largest weight is executed first.

9. The at least one non-transitory computer readable medium of claim 8, wherein the queries are inserted into the queue based on an order of their weights.

10. The at least one non-transitory computer readable medium of claim 8, wherein a highest weight for any query in the queue is 1, where a query in the queue with a highest weight is executed first.

11. The at least one non-transitory computer readable medium of claim 10, wherein a longest a query in the queue has to wait before its weight becomes 1 is:

$1/p+Cw=1$, where $w=(1/C)(1-1/p)$, and p is the processing time, C is a constant and w is the wait time.

12. The at least one non-transitory computer readable medium of claim 8, wherein a weight function used to determine the weights of the queries is from a weight family characterized by:

$f=C_1/p+C_2 w^k$ where, $C_1$ and $C_2>0$, and k, $C_1$ and $C_2$ are constants, p is the processing time of the query, and w is the wait time.

13. The at least one non-transitory computer readable medium of claim 12, storing instructions to select values for $C_1$ and $C_2$ such that the queue represents more closely a shortest job first queue rather than a first-in-first-out queue, and such that starvation is avoided for queries having large execution times.

14. A system comprising:
   a processor; and
   a non-transitory computer readable medium storing instructions that when executed by the processor cause the processor to implement an opportunistic query scheduling scheme to:

maintain a queue of queries, the queue identifying an order for executing the queries;

receive a new query;

determine, for the new query and for each of the queries in the queue, a stretch metric indicative of a Quality of Service (QoS) measure, wherein the stretch metric for each of the queries is based on an end time of the query, an arrival time of the query, and the processing time of the query;

minimize an $I_p$ norm of the stretch metric for at least some of the queries in the queue, wherein p is a finite, real number greater than 1;

determine a weight for the new query and a weight for each of the queries in the queue, wherein the weight for a query is based on the stretch metric of the query, and wherein the weight of a largest query in the queue is determined to be a largest weight only if such determination does not cause the stretch metric of the smallest query in the queue to exceed a predetermined threshold wait time;

determine a position in the queue to insert the new query by comparing the weight of the new query to the weights of the queries in the queue;

insert the new query in the determined position in the queue; and select a query from the queue to execute based on the order for executing the queries identified from the queue, wherein the query with the largest weight is executed first.

15. The system of claim 14, wherein minimizing the $I_p$ norm of the stretch metric comprises minimizing an $I_2$ norm or an $I_3$ norm of the stretch metric.

16. The system of claim 14, wherein a highest weight for any query in the queue is 1, where a query in the queue with a highest weight is executed first.

17. The system of claim 16, wherein a longest a query in the queue has to wait before its weight becomes 1 is:

$1/p + Cw = 1$, where $w = (1/C)(1 - 1/p)$, and p is the processing time, C is a constant and w is the wait time.

18. The system of claim 14, wherein a weight function used to determine the weights of the queries is from a weight family characterized by:

$f = C_1/p + C_2 w^k$ where, $C_1$ and $C_2 > 0$, and k, $C_1$ and $C_2$ are constants, p is the processing time of the query, and w is the wait time.

19. The system of claim 18, further comprising:

selecting values for $C_1$ and $C_2$ such that the queue represents more closely a shortest job first queue rather than a first-in-first-out queue, and such that starvation is avoided for queries having large execution times.

* * * * *